United States Patent [19]

Sieradzki

[11] Patent Number: 5,077,072
[45] Date of Patent: Dec. 31, 1991

[54] METHOD AND APPARATUS FOR COOKING FOOD ON A BELT

[76] Inventor: Stephan A. Sieradzki, 7880 W. 20 Ave. #40, Hialeah, Fla. 33016

[21] Appl. No.: 408,752

[22] Filed: Sep. 19, 1989

[51] Int. Cl.$^5$ .......................... A23L 1/00; A47J 37/00
[52] U.S. Cl. ..................................... 426/523; 99/386; 99/373; 99/443 C
[58] Field of Search ................. 99/386, 373, 393, 423, 99/443 C; 426/523, 505

[56] References Cited

U.S. PATENT DOCUMENTS

| | | | |
|---|---|---|---|
| 2,112,309 | 3/1938 | Santillan | 99/423 |
| 3,225,716 | 12/1965 | Krooss et al. | 99/443 C |
| 3,256,803 | 6/1966 | Nelson | 99/443 C |
| 3,371,595 | 3/1968 | Peters | 99/443 C |
| 3,659,517 | 5/1972 | Holen | 99/443 C |
| 3,965,807 | 6/1976 | Baker | 99/393 |
| 4,043,259 | 8/1977 | Sato | 99/373 |
| 4,389,562 | 6/1983 | Chandior | 99/443 C |

Primary Examiner—George Yeung
Attorney, Agent, or Firm—Hugh D. Jaeger

[57] ABSTRACT

A method and apparatus for forming and/or cooking food products upon an imperforate thermally conductive belt has a food dispenser above the belt, a heat plate under the belt, an upper heating structure, novel structure to maintain conductive thermal contact between the belt and the heat plate, a food stripper to remove the heated food and invert it for placement upon a second belt, a filling dispenser, and food rolling structure to roll the cooked food up into a tubular shape. The method has the steps of conductively cooking the food on the belt, stripping the food off of a first section of belt, and rolling the food on a second section of belt. The method and apparatus are particularly useful for crepes, pancakes, pasta, and pastry type foods. A single embodiment of the apparatus is capable of producing several entirely different types of cooked and formed food products. The apparatus is relatively small and is suited particularly well for on-site use by a retailer or concessionaire.

18 Claims, 4 Drawing Sheets

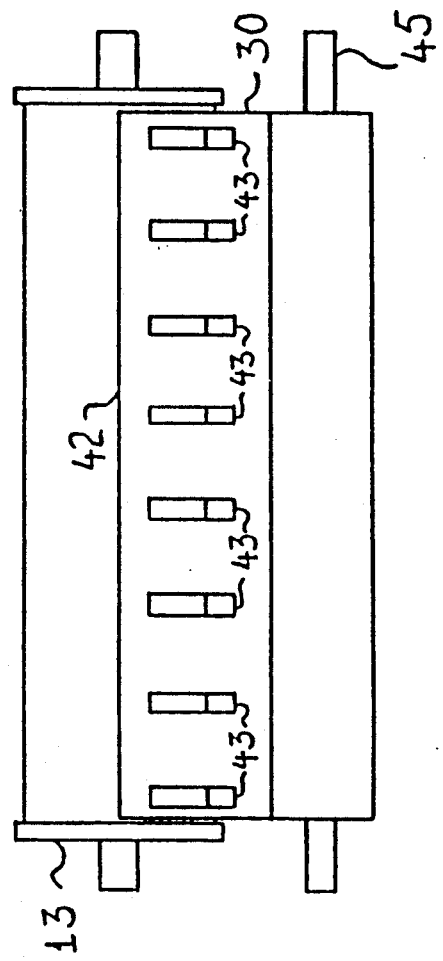
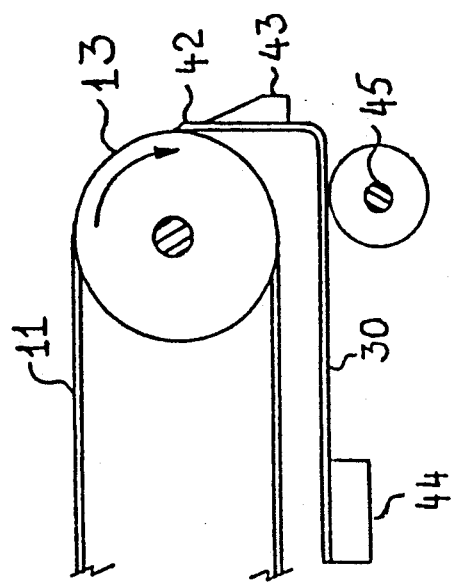
FIG 4
FIG 3

5,077,072

METHOD AND APPARATUS FOR COOKING FOOD ON A BELT

BACKGROUND OF THE INVENTION

1. Field of the Invention

This invention pertains to a method and apparatus for cooking food on a thermally conductive belt.

2. The Prior Art

In the prior art separate cooking methods and device are provided for the likes of pancakes, crepes, omelettes, french toast, cookies, and other generally flat food products made from batters and liquid mixes.

The use of chain conveyers and flat metal grills is common and well known.

There is no single machine that can make and cook pancakes, crepes, omelettes, and so forth.

OBJECTS OF THE INVENTION

It is an object of this invention to provide a new and improved method and apparatus for cooking food with a thermally conductive moving belt.

It is an object of this invention to provide a new machine and method for making crepes, pancakes, pasta, pastries and the like.

SUMMARY OF THE INVENTION

A method of cooking food has the steps of dispensing food onto a thermally conductive belt, moving the belt over a heating element, biasing the belt into thermal contact with the element, and removing heated and solidified food from the belt.

A method of cooking food has the steps of dispensing a unit of food upon a first thermally conductive belt, moving the belt and food over a heating element and conductively cooking and solidifying the food, removing the food from the first belt and inverting the food, placing the inverted food upon a second thermally conductive belt and conductively heating an original top side of the food.

A method of cooking food has the steps of placing a unit of food upon a belt, moving the food and belt over a heating element, engaging the food with a roller having a surface moving in proximity to the belt, rolling the cooked food into a generally tubular shape, and removing the rolled and cooked food from the roller and the belt.

A food cooking machine has first and second thermally conductive flexible belts, structure for moving the belts, structure for placing food upon the first belt, a heater under the first belt and structure for transferring the food from the first to the second belt and for inverting the food, and structure for adding value to the inverted food while on the second belt.

A food cooking machine has a thermally conductive flexible belt, a heating element under the belt, structure for placing food upon the belt and for removing food from the belt, structure for moving the belt, and structure for holding the belt in conductive thermal contact with the heating element.

A food cooking and forming machine has a heating element under a movable flexible belt, a food roller for lifting and rolling the food into a tubular configuration, and structure for removing the rolled food from the belt and the roller.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 3 is a side elevational view of the food stripper of the machine of either FIGS. 1 or 2;

FIG. 4 is an end view of the structure of FIG. 3, taken through lines IV—IV of FIG. 2.

DESCRIPTION OF THE PREFERRED EMBODIMENT

Figure 1:
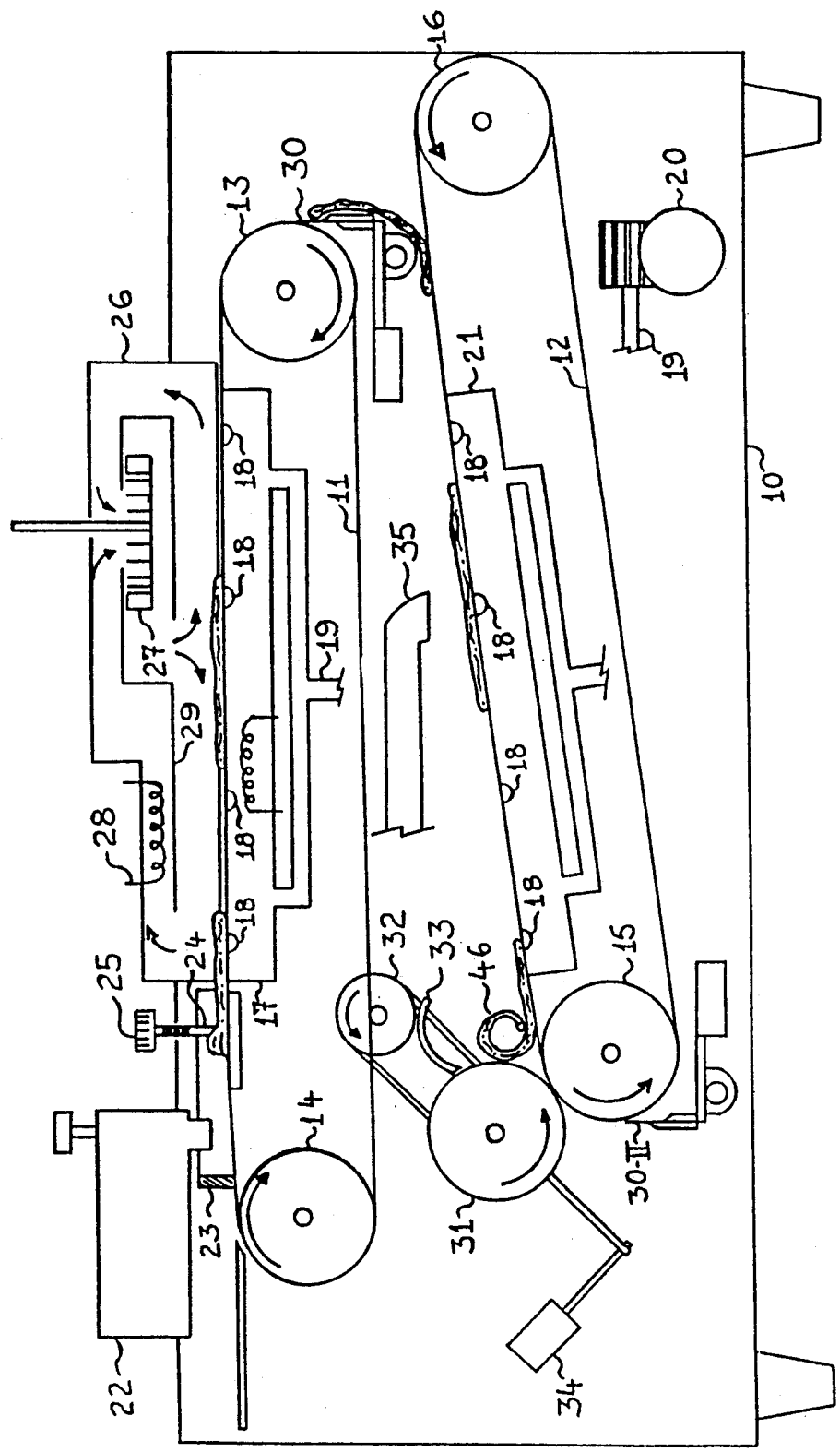
FIG. 1 is a side elevational view of a food cooking machine according to the present invention.

FIG. 1 shows a food cooking machine generally indicated by the numeral 10 which has first and second thermally conductive flexible closed loop flat cooking belts 11, 12. The belts 11, 12 are preferably 3 mil thick imperforate TEFLON belts with glass, carbon or other suitable fiber re-inforcement and an angled end loop joint. The upper belt 11 is wrapped on a driver roller 13 and a tension roller 14. The second belt 12 is likewise wrapped upon a driver roller 15 and a tension roller 16. Within the first belt 11 and directly underneath its upper portion is an electric hot plate heater element 17 having electronic controls for maintaining a 400 degree F. or thereabout temperature. Within the element 17 are vacuum ports 18 which are connected by a vacuum line 19 to a vacuum pump 20. The lower belt 12 has a similar hot plate heat element 21 with a similar vacuum structure. The two belts 11, 12 are arranged to be driven at the same surface speed, and preferably continuously. The rate of surface speed may be varied with an appropriate electronic control to the drive motor(s) which are not shown.

Atop of the first belt 11 and spaced upstream from the heater element 17 is a food dispenser 22 which includes a vat, a valve mechanism and a valve operator, all of conventional and well known type. The dispenser 22 has an outlet above an unheated portion of the belt 11 and above a food pocket 23 having front and side walls directly atop the belt 11. The outlet from the food pocket 23 is partially closed by an inverted weir (or "doctor blade") 24 which can be adjusted up and down in relationship to the belt 11 by an adjustment screw 25. The weir 24 is over an unheated portion of the belt 11 and is spaced upstream from the heater element 17. Atop the belt 11 is a convection heater having a shroud 26, a motor driven air fan 27, an electric heater element 28 and a divider 29 to establish a closed circuit loop heating system. The shroud 26 has a footprint which at least covers the heater element 17, and both the heater element 17 and shroud 26 span the entire operative width of the belt 11. At the end of the top of the belt 11 is a resiliently biased food scraper 30. The scraper 30 is directly above the second belt 12. At the end of the second belt 12 is a second scraper 30-II. At the discharge end of the second belt 12 is a rotating full width food roller 31 which is driven at a surface speed whch is faster than the surface speed of the belt 12. The food roller 31 is preferrably driven by a discrete motor 32 and has a surface speed which is at least twice the surface speed of the belt 12. The food roller 31 is normally in direct contact or close proximity with the belt 12 and a centrally located roll separator 33 separates the food off and the food roller 31. A lift mechanism 34 is provided to selectively lift the food roller 31 up and off of the belt 12. Note that the upper surfaces of the belts 11, 12 travel in opposite directions; the first or upper belt 11 travels left to right and the second or lower belt 12 travels right to left. Above the lower belt 12 and upstream of the food roller 31 is a filling dispenser 35.

Figure 2:
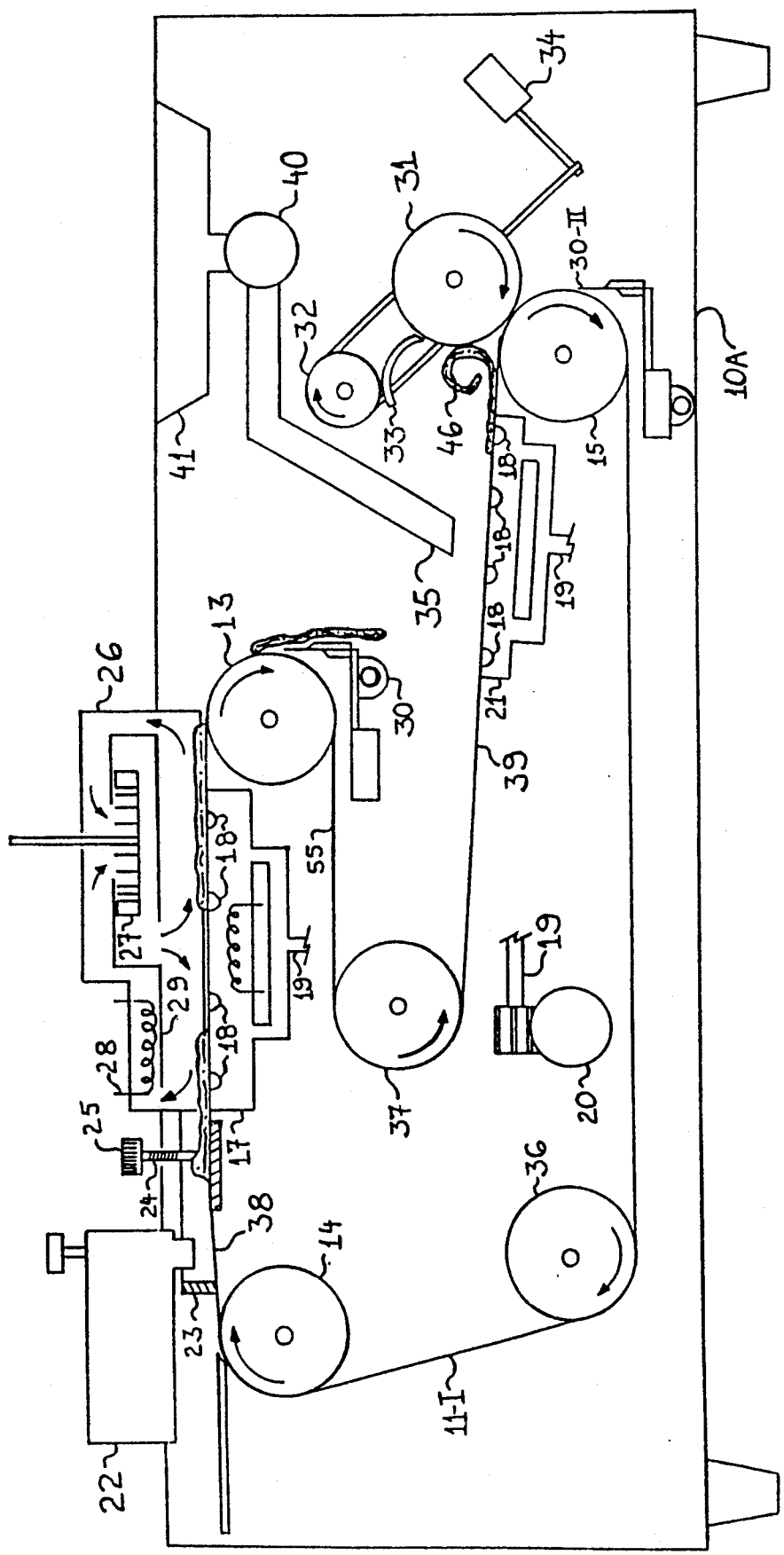
FIG. 2 is a side elevational view of an alternative embodiment of a food cooking machine according to the present invention.

In FIG. 2, the alternative preferred machine 10A has many of the same components as the machine of FIG. 1. These same components are identified by the same numerals. The alternative machine 10A has a single belt 11-I which is looped over an additional pair of belt rollers 36, 37 forming a S-shaped belt curvature 55 to separate a first or upper section 38 and second or lower section 39 of the single belt 11-1. A filling dispenser pump 40 and filling hopper 41 are connected to the filling dispenser 35 which is over the belt second section 39 just upstream of the food roller 31. The single belt 11-1 is intended to be operated at adjustable surface speeds and the roller 31 has a faster surface speed. The food dispenser 22, filling pump 40 and lift mechanism 34 are periodically operated. The vacuum pump 20 is continually operating and the heater elements 17, 21 are under automatic thermostatic control.

FIGS. 3 and 4 show the new belt scraper 30 of this invention. The scraper 30 has a scraper piece 42 of Mylar brand or chemically equivalent sheet or film of about 0.015 inches thick that is resiliently biased into and against the belts 11, 12 in a generally tangent configuration as shown. The scrapers 30 have protrusions 43 to eject the food off of the scraper 30, and a mechanical counter weight 44 biases the scraper 30 around a fulcrum shaft 45.

In the operation of the machine 10 of FIG. 1 and in the practice of the method of this invention, the heaters 17, 21 are brought up to about 400 degrees F. and the belts 11, 12 are moving as the vacuum pump 20 is on. The dispenser 22 discharges a liquid unit of food into the pocket 23. The upper belt 11 pulls the liquid food under the weir 24 and the weir 24 determines the height of the food layer on the belt 11. The food is then pulled over the heater 17 whereupon the vacuum pulls the belt 11 into tight and intimate conductive thermal contact with the heater 17. The convective heater system above captures much of the otherwise unused heat from the heater 17. The lower or first surface of the food is cooked and the food is solidified. The scraper 30 then scrapes the solidified food off of the upper belt 11 and the food is inverted as it is taken by the lower belt 12 past the filler 25 where filling of berries, pudding, and so forth may be dispensed upon the food. The lower heater 21 works the same as the upper heater 17 to finish cooking the second and original top side of the food. The roller 31 then picks up the leading edge of the cooked food and the food roller 31 rolls the cooked food up into an empty or filled crepe as the case may be. The food roller 31 is then lifted and the rolled food is released from the belt 12 and the food roller 31. The food roller 31 can be lifted and retained in the alternative up position in which case the machine 10 will make a flat food, cooked on both sides, a specific example of which are pancakes.

In the operation of the method and in the use of the alternative machine 10A, the belt upper section 38 functions the same as the first belt 11 and the lower section 39 functions the same as the second belt 12. As the food is scraped off of the upper section 38, pancakes are flipped and inverted by the scraper 30 whereas crepes will continue same side up. The food roller 31 and roll separator 33 work as previously described. Again the food roller 31 may be locked up to make rigid/flat food such as pancakes.

It has been found that in the rolling of the generally tubular food shapes 46 that it is highly desirable to firstly strip the solidified food product from the belt 11, 11-I at the first stripping station with the first food scraper 30; this breaks the adhesion of the initially liquid food to the belt 11, 11-I and the subsequent adhesion is significantly less at the time of rolling.

Figure 5:
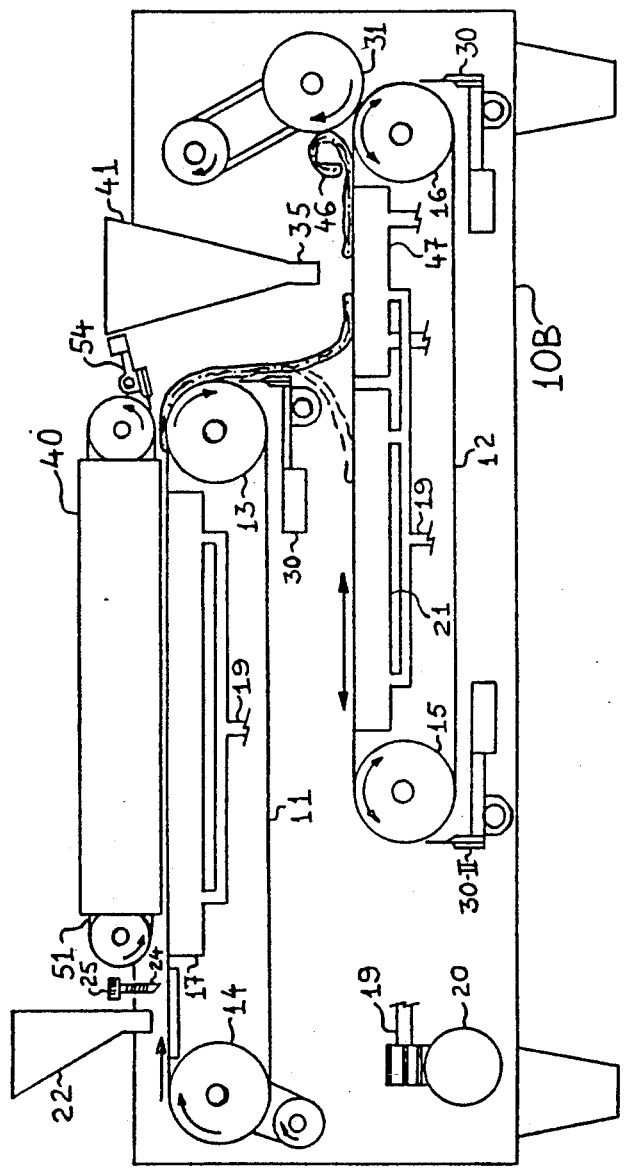
FIG. 5 is a side elevational view of a further alternative food cooking machine according to the present invention.

In FIG. 5, the second belt 12 has been moved with respect to the first belt 11 so that the second belt 12 is now center loaded. Underneath the second belt 12 is the second heater element 21 and a discrete heat exchanger 47. The heat exchanger 47 has both electric heating and water cooling structure for warming, cooking, or cooling the food. The cooking or cooling structure and capability enables effective filling of sour cream, whipped cream, and the like into crepes or "roll-ups". As you look at FIG. 5, crepes and roll-ups go to the right on the second belt 12 and pancakes and french toast go to the left. The second belt 12 is driven by a motor and drive which can move the second belt 12 in either direction.

Figure 6:
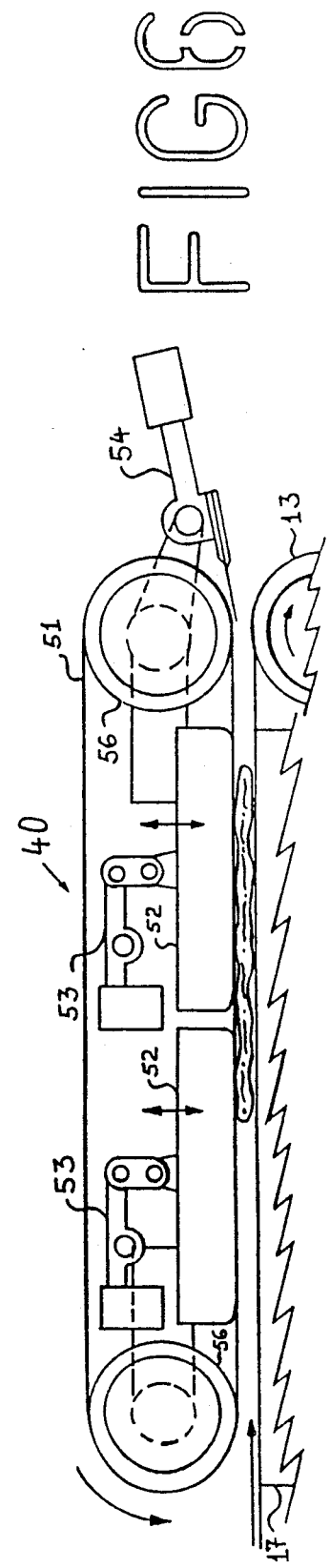
FIG. 6 is a side elevational view in detail of the upper cooking element in the machine of FIG. 5.

In FIGS. 5 and 6, an optional upper heating unit 40 is shown with a top belt 51 looped around belt rollers 52 which may be driven or not driven. Within the top belt 51 is at least one and preferably two heated hot plates 52 which are movably mounted and suspended by counterweight mechanisms 53 to provide a minimal downward pressure on the top belt 51 and the food. The top belt 51 and heaters 52 are preferably spaced partially downstream from the primary heater 17. An inverted food scraper 54 is provided on the top belt 51. The upper heating unit 40 is particularly effective for high production of pancakes.

This new machine 10, 10A, 10B and new method are a new and highly effecient device and method for making crepes, roll-ups, pasta, pancakes, french toast and other cooked food products out of liquid mixes or batters, on a single machine. The energy use is modest and the machines 10, 10A, 10B can run continuously or intermittently to make small lot production upon demand.

Although other advantages may be found and realized and various modifications may be suggested by those versed in the art, wish to be it understood that I wish to embody within the scope of the patent warranted hereon, all such embodiments as reasonably and properly come within the scope of my contribution to the art.

I claim as my invention:

1. A method of cooking food comprising the steps of
   a) dispensing a liquid unit of food upon an imperforate thermally conductive belt;
   b) moving the belt and the liquid unit of food over a heating element and conductively heating and solidifying the food;

c) biasing the moving belt into thermal contact with the heating element during heating of the food, said biasing step being done with a partial vacuum; and d) removing the solidified food from the belt.

2. The method of claim 1, in which said heating element is a hot plate, and including the steps of electrically heating the hot plate while pulling the belt and food over the hot plate, in which the step of biasing is done with biasing means at least partially in the heating element, and in which said biasing means are vacuum ports.

3. The method of claim 1, including a second step of biasing between a second section of the belt and a discrete second heating element, and including the step of using a single vacuum source for both steps of biasing.

4. The method of claim 1, including the step of maintaining a continuous biasing vacuum.

5. The method of claim 1, including the step of using a vacuum pump remotely located from the heating element to effect the vacuum at the heating element.

6. The method of claim 3, including the step of using two belts, the second section being a section of the second belt.

7. The method of claim 3, including the further step of using a single belt, and reversing the belt in a S-shaped belt curvature between the two heating elements.

8. The method of claim 3, including the further step of filling the food during the second biasing step.

9. The method of claim 8, including the further step of cooling the food during the second step of biasing.

10. A food cooking machine comprising
a) a thermally conductive imperforate flexible belt;
b) a heating element underneath said belt;
c) means for moving said belt over said heating element;
d) means for placing food upon said belt and means for removing food from said belt;
e) means for holding said belt in conductive thermal contact with said heating element;
f) said heating element being a hot plate, said holding means being structured at least in part in said hot plate; and
g) said holding means includes vacuum ports in said hot plate.

11. A food cooking machine comprising
a) a thermally conductive imperforate flexible belt;
b) a heating element underneath said belt;
c) means for moving said belt over said heating element;
d) means for placing food upon said belt and means for removing food from said belt;
e) means for holding said belt in conductive thermal contact with said heating element; and
f) said holding means includes a vacuum pump operatively connected to vacuum ports under said belt.

12. The machine of claim 11, including a second heating element, second holding means, and a S-shaped belt curvature in said belt intermediate said two heating elements and said two holding means.

13. The machine of claim 11, including a second heating element, second holding means, and a common single vacuum pump source of holding force for both holding means.

14. The machine of claim 11, including means for continually operating said vacuum pump holding means during food cooking.

15. A food cooking machine comprising
a) a hot plate,
b) a vacuum pump operatively connected to suction means in proximity to said hot plate;
c) thermally conductive food moving means for moving food over said hot plate and said suction means, wherein
d) said suction means being operative for pulling said food moving means into thermally conductive contact with said hot plate.

16. The machine of claim 15, wherein said food moving means is a flexible imperforate belt.

17. The machine of claim 16, wherein said belt is a closed loop, said hot plate and suction means being inside said loop.

18. The machine of claim 15, including means for continuously operating said vacuum pump during food cooking.

* * * * *